Aug. 5, 1924.  1,503,500
E. E. HEINTZ
WINDOW REGULATOR WHEEL BEARING
Filed Aug. 27, 1923
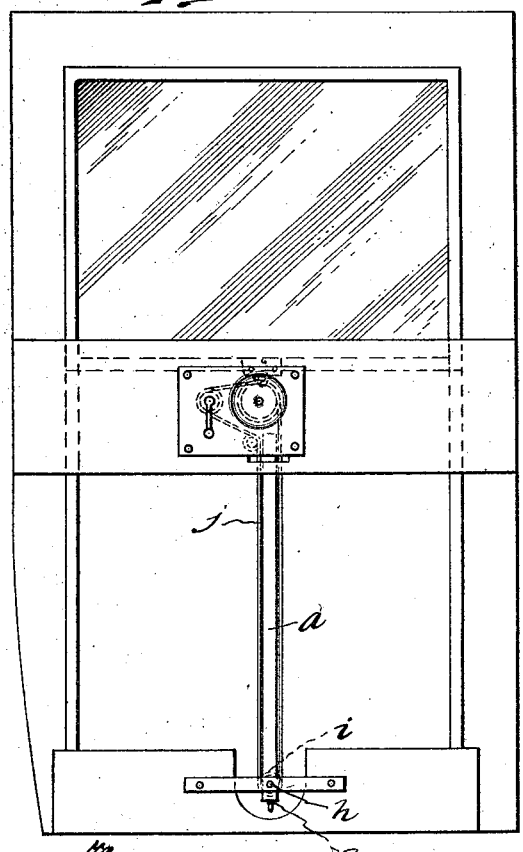
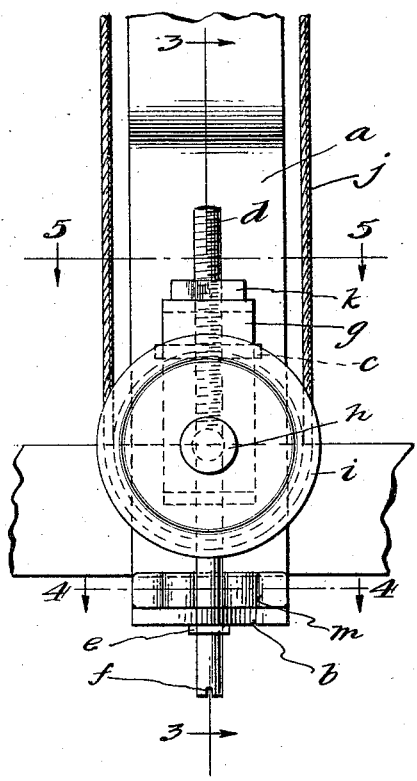
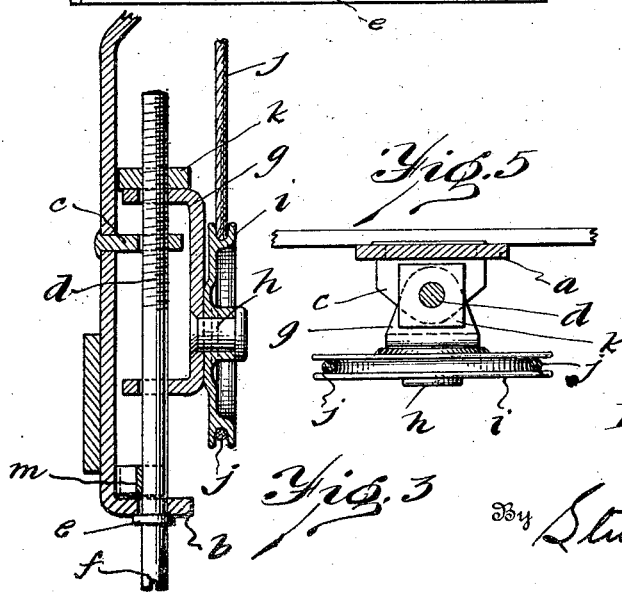
Inventor
Ernest E. Heintz
By Stuart C. Barnes
Attorney Patented Aug. 5, 1924.

1,503,500

UNITED STATES PATENT OFFICE.

ERNEST E. HEINTZ, OF DETROIT, MICHIGAN, ASSIGNOR TO TERNSTEDT MANUFACTURING COMPANY, OF DETROIT, MICHIGAN, A CORPORATION OF MICHIGAN.

WINDOW-REGULATOR WHEEL BEARING.

Application filed August 27, 1923. Serial No. 659,450.

*To all whom it may concern:*

Be it known that ERNEST E. HEINTZ, citizen of the United States, residing at Detroit, in the county of Wayne and State of Michigan, has invented certain new and useful Improvements in Window-Regulator Wheel Bearings, of which the following is a specification.

This invention relates to window regulators and has for its object an improved lower sheave or sprocket bearing which avoids any tendency of the cable or chain to run off the sheave or sprocket.

This bearing has two features of improvement over the prior art. It is not broadly new to employ a rocking bearing for preventing the chain running off from the lower sprocket. The rocking brackets however, that have been heretofore employed to accomplish this function have had an automatic slack take-up in the form of a helical spring. The present construction does away with the automatic take-up and introduces a positive slack take-up which may be adjusted by the installer of the regulator. This positive or set adjustment slack take-up is not only cheaper to manufacture but it is so arranged as to avoid a difficulty that has caused considerable trouble in regulators, namely: the action of the clutch in locking slack in the chain or cable.

In the drawings:

Fig. 1 is an elevation of a door equipped with a window regulator having the improved lower bearing.

Fig. 2 is an elevation of the sheave and bearing.

Fig. 3 is a section on the line 3—3 of Fig. 2.

Fig. 4 is a section on the line 4—4 of Fig. 2.

Fig. 5 is a section on the line 5—5 of Fig. 2.

It is not broadly new to employ a rocking bearing to prevent the lower sprocket wheel or sheave from misalignment with the upper sprocket or drum, resulting in the chain or cable running off the lower end of the regulator. This same combination is shown and claimed in the Lawrence and Allmand Patent No. 1,317,150, dated September 30, 1919. This construction is provided, however, with a coiled spring which tends to take up the slack automatically. These springs, although simple in construction, are somewhat expensive compared to the simple structure which I am about to describe. They involve therefore, quite an expensive item in a regulator construction which is bidding in a cheap market. Furthermore, one fault that developed in the spring or automatic slack take-up is the locking of the slack in the chain or cable. For instance, if the turning effort is continued on the handle after the window has reached the top of its travel, the sprocket cannot move the window. This results in the raising of the lower sprocket against the thrust of the spring. When the spring is completely collapsed then of course, the handle cannot be turned any further. As soon as the turning effort is released upon the handle, the clutch locks the parts in this position; that is, with the chain tensioning spring completely collapsed. This obviously, results in slack in the up-running cable on the other side. In the case of chain regulators, this slack permitted the chain to slash back and forth, making a disagreeable pounding and drumming on the door panels.

In the Patent No. 1,463,422 issued on the application of Ernest E. Heintz, on the 31st day of July, 1923, this objectionable condition is described at length. There is shown in this patent, a clutch provided with devices for delaying the clutch action to correct this fault. By adopting the construction which we have portrayed in the drawings, this trouble is entirely obviated, for although the lower wheel is adjustable and is also capable of rocking on a vertical axis, the lower wheel bearing or bracket is abutted in such a way as to resist any effort tending to raise it and hence it is impossible for the fault alluded to to occur with sprocket and chain regulators.

Referring to the details:

$a$ designates a spacer bar having its lower end turned up to form a guide lug $b$. A second guide lug $c$ is riveted into the spacer bar above the first mentioned guide lug. Passing through openings with a relatively sloppy fit, is the threaded spindle $d$ provided at its lower end with an upset collar $e$, and at the extreme end with a screw driver slot $f$. This spindle is also threaded through the yoke-like bracket $g$, to which is riveted the stud $h$, on which rotates the sheave $i$. This sheave in view of the fact that a sprocket could as well be used, will be broadly designated in the claims as a wheel. The cable $j$ runs around the sheave.

A nut $k$ is located above the yoke-like bracket $g$ and the nut is of such a size that one of its flat sides lies directly against the spacer bar. Consequently, it is impossible to turn the nut onto the spindle, but the spindle must be turned into the nut by applying a screw driver on its lower end in the screw driver slot $f$. Now, obviously, by continuing to turn, in view of the presence of the collar $e$, the nut $f$ becomes a follower bearing against the upper end of the bracket $g$. When sufficient turns have been taken, the follower will pick up the bracket and cause it to slide down the spindle until the tension upon the cable becomes sufficient to arrest it. This follower affords a positive adjustment, and hence, when the crank handle is turned after the window reaches its uppermost limit, this follower will immediately arrest any effort made to lift the bracket $g$. Consequently, it is impossible to lock the slack in a chain.

The flat spring $m$ has two functions. One of its functions is to press the spindle outwardly to prevent any rattling by reason of the spindle having a somewhat sloppy fit in the openings through the guide lugs, and the bracket arms. The other function is that it operates to offer a frictional resistance to the turning of the spindle and consequently operates as a screw lock to prevent the turning of the spindle to loosen the adjustment.

What I claim is:

1. In a window regulator wheel bearing, the combination of a supporting member, a vertical spindle provided with an abutment fixable at various points along the supporting member, a bracket supported on the spindle to rock on a vertical axis, a wheel rotatably supported on the bracket, and a linear member running over the wheel, said bracket being arranged to be abutted by the abutment of the spindle for the purpose of tensioning the linear member and positively hold it in such position of tension.

2. In a window regulator wheel bearing, the combination of a spacer bar provided with guiding means, a vertical threaded spindle provided with a collar for preventing the spindle from rising in said guide means in which the spindle is held, a nut screwing on to the threads of the spindle, a bracket supported on the spindle to swing on a vertical axis and abutting against the nut when the spindle is turned to advance the nut against the bracket, a wheel rotatably supported on the bracket and a flexible linear member running over the wheel to be tensioned by the nut.

3. In a window regulator wheel bearing, the combination of a spacer bar provided with a pair of guide lugs having holes therethrough, a threaded spindle running up through said holes in the guide lugs and provided with a collar for preventing the spindle from being drawn upward, a nut screwed onto the upper end of the spindle but locked from turning by reason of abutting against the spacer bar, a bracket supported to swing on a vertical axis on said spindle and arranged to abut against the nut when the nut is drawn down against the bracket by turning the spindle, a wheel rotatably supported on the bracket and a linear flexible member running over the wheel and tensioned by drawing the nut against the bracket.

4. In a window regulator wheel bearing, the combination of a spacer bar, a pair of guide members carried on the spacer bar provided with openings, a spindle passed loosely therethrough, a bracket having openings through which the spindle is threaded, the said bracket rockable on the spindle on a vertical axis, means operating in connection with the spindle for holding the bracket in a given position on the spindle against longitudinal movement, a wheel rotatably mounted on the bracket, a flexible linear member passing over the wheel and a spring bearing between the bar and the spindle to prevent rattling.

5. In a window regulator wheel bearing, the combination of a spacer bar, a pair of guide lugs having openings therethrough and carried upon the spacer bar, a threaded spindle passing through the openings in the guide lugs loosely and provided with a collar for preventing upward movement of the spindle through the guide lugs, a bracket through which the spindle is threaded, a nut into which the spindle is screwed and which lies abutting against the spacer bar to prevent turning, a bracket rotatably supported on the spindle below the nut, a wheel rotatably supported on the bracket, a flexible linear member running over the wheel, and a piece of spring metal bearing against the spacer bar and against the spindle for thrusting it outward to take up looseness in the bearings and for preventing its turning.

In testimony whereof he has affixed his signature.

ERNEST E. HEINTZ.